FIG. I

3,579,292
PROCESS AND COMPOSITION FOR SEPARATION OF OXYGEN FROM AIR USING STRONTIUM OXIDE-PEROXIDE AS THE CARRIER

Joseph T. Mullhaupt, Tonawanda, and Silviu A. Stern, De Witt, N.Y., assignors to Union Carbide Corporation, New York, N.Y.
Filed Jan. 8, 1969, Ser. No. 789,908
Int. Cl. B01d *53/34;* C01b *13/08, 15/04*
U.S. Cl. 23—2                                        22 Claims

ABSTRACT OF THE DISCLOSURE

By incorporating at least one ion of a metal from Groups I–A, I–B and VIII of the Deming Periodic Table into a strontium oxide-peroxide reaction mass, a great increase in the oxidation and reduction rates of the mass is obtained. This increase in reaction rates makes it feasible to use this system as the oxygen carrier in a cyclic, reversible oxidation-reduction process for the separation of oxygen from air.

BACKGROUND

The present application relates to a method for increasing the reaction rates of the reversible reaction $SrO + \frac{1}{2} O_2 \rightleftarrows SrO_2$. Such increase in the reaction rates renders this system particularly useful for the separation of oxygen from air, by a cyclic reversible chemical reaction whereby oxygen from the air is separated by first being reacted with strontium oxide to form strontium peroxide and thereafter being recovered as the sole gaseous reaction product resulting from the decomposition of the peroxide. The present invention also relates to the solid substantially crystalline strontium oxide-peroxide reaction mass having the improved reaction rates, and to the method of preparing said reaction mass.

The industrial requirements for relatively pure oxygen are very large and grow larger daily. Because of this de-demand, extensive investigations into a host of diverse techniques have over the years been undertaken to arrive at a process which is commercially as well as scientifically feasible.

Of the physical methods investigated, commercial success has been achieved only by fractionation of liquefied air. By far, the largest quantity of oxygen presently employed in industry is produced by this method. Other physical methods, which have been far less successful, include those which employ centrifugation as a means of partial separation of oxygen from nitrogen, and those which relay upon the differences in the solubility of oxygen and nitrogen in common solvents.

Chemical processes taking advantage of the ability of certain chemical compounds or elements to combine selectively and reversibly with oxygen from the air have long been proposed in the art. Both organic and inorganic masses have been investigated. One, the co-called Brin processes was used commercially prior to development of liquefied air separation techniques. The Brin process is based on the ability of barium oxide (BaO), when heated in contact with air, to unite with an atom of oxygen forming barium peroxide ($BaO_2$), and when heated further, to decompose liberating the second oxygen atom and re-froming barium oxide. This process, as originally practiced, consisted of heating the barium oxide to about 500° C. in order to oxidize it to the peroxide. The peroxide was then heated to about 800° C. in order to drive off the oxygen, leaving barium oxide as the residue. Subsequently, the process was modified to maintain the barium oxide-peroxide mass at 700° C. and to effect oxidation and dissociation of the reaction mass by means of a pressure swing cycle.

Numerous other chemical masses have also been investigated without significant commercial success. For example, a process based on a chemical reaction mass consisting of an oxide of manganese in admixture with caustic soda, commonly called the duMotay process underwent many modifications by various investigators, but no commercially useful process was ever developed. In the Mallet process cuprous chloride is oxidized to form an oxychloride which is then dissociated at elevated temperatures to produce oxygen and the starting cuprous chloride.

Organic chemical reaction masses have also been investigated. For example, cobalt salicylaldehyde ethylenediamine, known in the art as "Salcomine," was widely investigated. This material is a chelated organometallic compound capable of absorbing and desorbing oxygen at relatively low temperatures. The principle reason that this process is not commercially feasible is that the compound lacks long term stability.

The manufacture of oxygen by chemical means has been widely investigated not only with respect to finding suitable chemical reaction masses, but also with respect to methods of cycling. The greatest attention has been devoted to improving upon the three well known historical processes, i.e. the Mallet process, the Brin process and the duMotay process, all of which were discovered prior to the turn of the century.

Various methods of cycling the oxygen carrier materials have been considered. Thus, it has been proposed that fixed beds be used for the reaction masses, with the gaseous atmosphere above the reaction mass being cycled by pressure and/or temperature swings. It has also been proposed that the chemical reaction masses be moved continuously through absorption and desorption zones, for example, by fluidized bed techniques or by use of a liquid carrier.

It is known that strontium oxide can be oxidized to strontium peroxide and that the reaction can be reversed, so that the strontium peroxide is reduced to strontium oxide and oxygen. In theory, this reversible reaction could be used in a chemical air separation process utilizing the strontium oxide mass as the oxygen carrier. Squires, in U.S. Pat. No. 3,324,654 suggests the possibility of using strontium oxide in place of barium oxide as the oxygen carrier in a chemical air separation process. Squires, however, fails to give any experimental data to support his contention that the strontium oxide-peroxide system provides a practical oxygen producing system—which, in fact, it was not prior to the present invention. The few investigators who have experimentally examined the $SrO$-$SrO_2$ system have rejected it as unpromising for a practically useful air separation process, probably because the thermodynamics of the system appeared to be unfavorable and because sufficiently high rates of oxidation and dissociation were experimentally unobtainable.

Three factors are, in general, responsible for the present day lack of commercial feasibility for the manufacture of oxygen by the use of reversible chemical reaction masses. These are: (1) the high operating temperatures required, (2) the relatively low oxidation and dissociation rates of the chemical masses even at high temperatures and (3) the lack of long term reactivity or stability of the reaction masses. Practical requirements for a commercially useful system are first, that the reaction mass be capable of reversible oxidation and dissociation; second, that the equilibrium pressure of $O_2$ be greater than 0.2 atm. at temperatures below about 550° C.; and third, that the reaction mass have reaction rates in both the directions which are sufficiently fast to be economically practicable. In other words, a reversible system which operates sufficiently fast in both directions at reasonable temperatures and pressures is required.

OBJECTS

It is a object of this invention to provide a method for increasing the reaction rates of the reversible reaction:

$$SrO + \tfrac{1}{2}O_2 \rightleftharpoons SrO_2$$

that is, for increasing the rates of oxidation and reduction (or dissociation) of a solid substantially crystalline reaction mass comprising the oxide and peroxide of strontium.

It is another object of the present invention to provide a commercially feasible process for separating oxygen from air (or other oxygen containing gas mixture) in which the oxygen carrying chemical reaction mass is stable during cyclical use, and possesses high oxidation and dissociation rates at reasonably low temperatures and pressure.

It is another object of this invention to provide a novel, solid, substantially crystalline strontium oxide-peroxide reaction mass suitable for use in the aforesaid oxygen producing process.

It is a further object of this invention to provide a process for the preparation of the aforesaid novel strontium oxide-peroxide reaction mass.

SUMMARY OF INVENTION

These and other objects, which will be apparent from the specification and accompanying claims, are accomplished in accordance with the present invention, one aspect of which relates to a method for increasing the reversible reaction rates of a solid, substantially crystalline strontium oxide-peroxide reaction mass by increasing both the rate of the oxidation of strontium oxide to strontium peroxide, and of increasing the reversible reduction rate of (or dissociation) of the peroxide to strontium oxide and oxygen, comprising: incorporating into said strontium oxide-peroxide reaction mass at least 0.5 mole percent, based on the total number of moles of metal ions, of at least one ion of a metal selected from the group consisting of the elements of Groups I-A, I-B and VIII of the Deming periodical table.

The term, "total number of moles of metal ions" means the sum of the number of moles of (1) strontium ions plus (2) the foreign metal ions added to increase the reaction rate of the reaction mass.

It is to be understood that the terms "reduction" and "dissociation" with respect to strontium peroxide are used interchangeably in the present specification and claims and are intended to mean the same thing.

Another aspect of the present invention relates to a method for separating oxygen from an oxygen-containing gas mixture, such as air, comprising the steps of:

(1) Contacting an oxygen containing gas mixture with a solid, substantially crystalline reaction mass comprising a mixture of strontium oxide and hydroxide containing therein at least 0.5 mole percent, based on the total number of moles of metal ions of at least one ion of a metal selected from the group consisting of the elements of Groups I-A, I-B and VIII of the Deming periodical table, thereby oxidizing at least a portion of the strontium oxide in said reaction mass to strontium peroxide, (2) Separating the solid oxidized reaction mass from the oxygen-depleted gas mixture, (3) Dissociating at least a portion of the strontium peroxide in said oxidized reaction mass, thereby reducing it to strontium oxide and liberating oxygen, and (4) Separating said liberated oxygen from the reduced solid reaction mass.

A third aspect of the present invention relates to the novel reaction mass having increased reversible oxidation and reduction rates, i.e. it relates to a solid, substantially crystalline reaction mass selected from the group consisting of the oxide, peroxide and hydroxide of strontium and mixtures thereof, containing therein at least 0.5 mole percent, based on the total number of moles of metal ions, of at least one ion of a metal selected from the group consisting of the elements of Groups I-A, I-B and VIII of the Deming periodical table.

A fourth aspect of the present invention consists of a method for preparing the solid, substantially crystalline reaction mass of the present invention. This method comprises the steps of:

(1) Contacting (a) an aqueous solution of strontium ions, (b) an aqueous solution of ions of the metal to be incorporated into said strontium reaction mass, and (c) an aqueous alkaline peroxide solution, thereby precipitating strontium peroxide octahydrate alone or in admixture with strontium hydroxide octahydrate containing the incorporated metal ions.

(2) Separating the precipitated solid from the aqueous solution, and (3) Drying the solid, substantially crystalline precipitate until a product consisting predominantly of anhydrous strontium peroxide containing the added foreign metal ions is obtained. The product may also contain strontium oxide and hydroxide therein.

With regard to the contacting step (1) above, it is to be noted that the order in which the solutions (a), (b) and (c) are contacted may consist of mixing together (a) and (b) and then adding (c), or (b) may first be mixed with (c) and (a) added thereafter. One may, however, not just mix (a) and (c) since this will cause premature precipitation of strontium hydroxide.

In the accompanying drawings:

FIG. 1 is a semi-logarithmic graph showing the equilibrium dissociation pressure for the system:

$$SrO + \tfrac{1}{2}O_2 \rightleftharpoons SrO_2$$

DETAILED DESCRIPTION OF THE INVENTION

The uniqueness of the present invention lies in the fact that by incorporating certain foreign metal ions into the strontium oxide-peroxide reaction mass, a great increase in the oxidation and reduction rates of the mass is obtained. This increase in the reaction rates makes it feasible to use this mass as the oxygen carrier in a cyclic, reversible oxidation-reduction process for the practical separation of oxygen from air.

Since the present invention is concerned with reaction rates and how they may be increased, it is important to define the term "reaction rate" theoretically and experimentally, to indicate the relationships between rates and equilibrium properties, and to examine the factors on which the rates depend.

Theoretical consideration

The principal species participating in the release and uptake of oxygen gas by the reaction mass are $O_2$ and the crystalline solids $SrO_2$ and $SrO$. Under certain conditions, these three phases may be inequilibrium as represented by the equations: $SrO_2 \rightleftharpoons SrO + \tfrac{1}{2}O_2$. The temperatures and pressures at which equilibrium may be achieved are given by the equation:

$$\log P = -(19{,}290/4.571T) + 1.75 \log T - 0.0016T + 2.8$$

where P is the pressure of oxygen in atmospheres, and T is the temperature in degrees Kelvin. It is convenient to show these temperatures and pressures graphically by plotting log P against 1/T. The equilibrium conditions on such a plot describe a line that is very nearly straight, as shown in FIG. 1.

Figure 1:
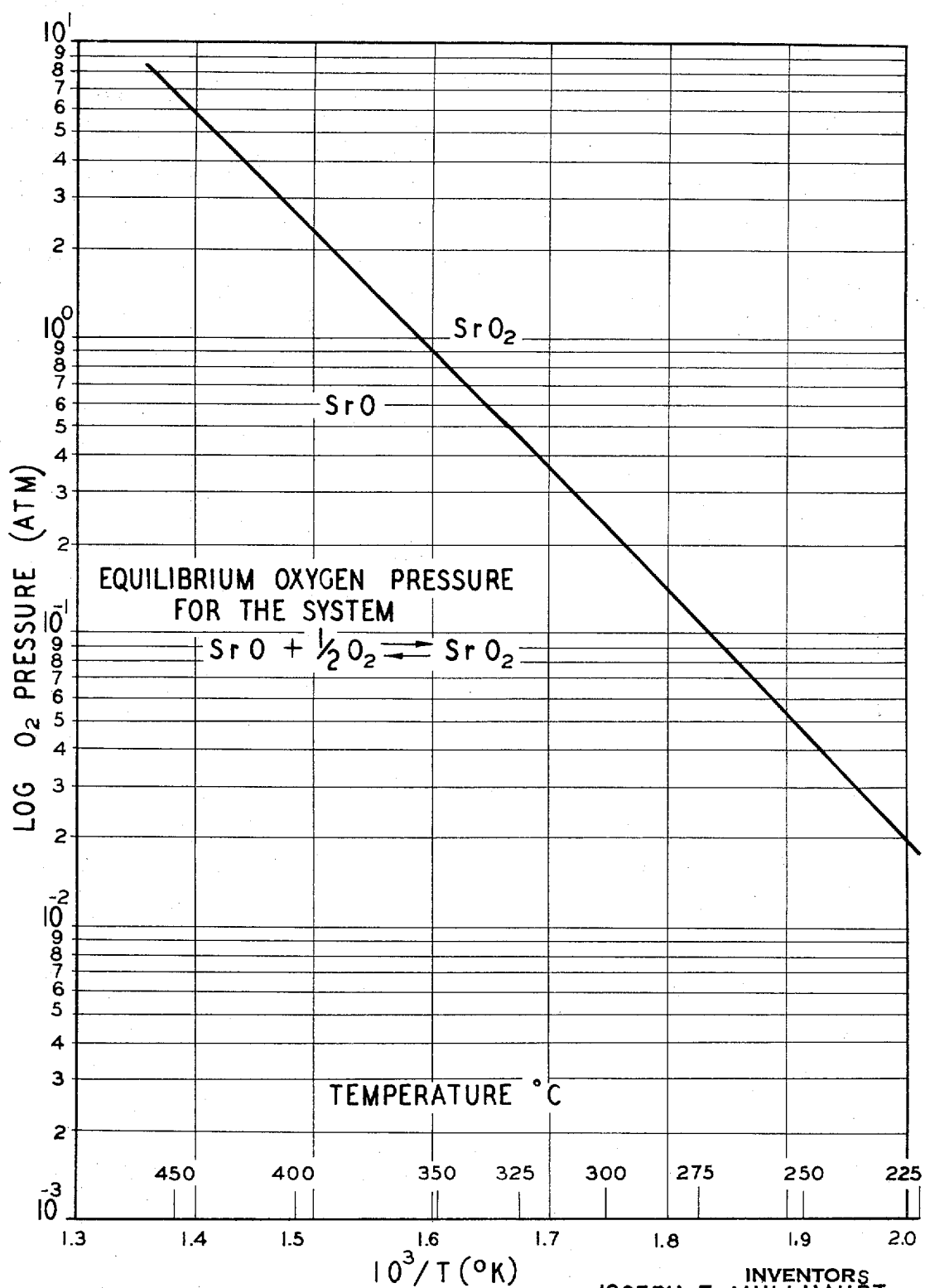

FIG. 1 displays a region of the strontium-oxygen phase diagram in which $SrO_2$ and SrO are stable in the presence of oxygen. The area above the line represents the region in which $SrO_2$ is stable. The area below the line represents the region in which SrO is stable. The line itself represents the region in which $SrO_2$ and SrO can coexist in the presence of oxygen. The thermodynamic properties of the $SrO_2$-SrO-$O_2$ system have not been found to be altered by the presence of other species in the reactive masses.

A reaction mass containing $SrO_2$ and/or SrO in the presence of $O_2$ at some arbitrary pressure and temperature will tend to react in such a way that a thermodynamically stable state is reached. Whether a stable state is accessible depends on the experimental conditions. For example, $SrO_2$ will dissociate to SrO and $O_2$ if the pressure or temperature is changed from values in the region where $SrO_2$ is stable to values below the equilibrium line. The reaction may stop when the equilibrium conditions are attained or go to completion, depending on the amounts of $SrO_2$ and $O_2$ present and whether the reaction takes place in an open or closed system. Similarly, SrO will oxidize to $SrO_2$ under the proper conditions.

Since the $SrO_2$-SrO-$O_2$ system is reversible, a reaction mass containing it may be dissociated and oxidized repeatedly (cycled) by adjusting conditions alternately below and above the equilibrium line. Oxygen gas is released as a product during the dissociation half-cycle and is taken up (from a gas mixture which is in contact with the solid, such as air) during the oxidation half-cycle.

The response of a reaction mass containing $SrO_2$ and/or SrO in the presence of $O_2$ to changes in pressure and temperature is characterized not only by the direction of reaction (that is, dissociation or oxidation), but also by the rate at which a stable state is approached. Both the direction and the rate are related to the displacement of pressure and/or temperature from values in a stable state. A useful and meaningful measure of the driving forces that tend to return the reaction mass to a stable state is the displacement from values of pressure and temperature on the equilibrium line. The direction of reaction is specified by the position of the imposed conditions with respect to the equilibrium line. More specifically, the direction of reaction is given by the sign of the displacement in temperature $(T_e-T)$ under isobaric conditions, or in pressure $(P-P_e)$ under isothermal conditions, where T and P are any specific temperature and oxygen pressure, and where $T_e$ and $P_e$ are values on the equilibrium line. If the sign of these displacements is negative, dissociation will occur; if the sign is positive, oxidation will take place. The rate at which the reaction proceeds is related to the magnitude of these displacements.

Although the exact mechanisms by which dissociation and oxidation occur in the system $SrO_2$-SrO-$O_2$ are not definitely known, the following fundamental processes are believed to be involved in the course of these reactions: (1) adsorption and desorption of $O_2$, (2) nucleation and growth of the product phase, (3) diffusion of ions and other species, and (4) the redox reactions

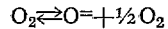

$$O_2^= \rightleftarrows O^= + \tfrac{1}{2} O_2$$

Both $SrO_2$ and SrO are ionic, crystalline solids with different, well-defined crystal structures.

For example, during the oxidation of SrO to $SrO_2$, $O_2$ must be adsorbed from the gas phase and oxide ions ($O^=$) must be oxidized to peroxide ions ($O_2^=$). Since the face-centered cubic arrangement of ions in the SrO crystal lattice cannot accommodate the $O_2^=$ ions on the sites of the smaller $O^=$ ions, a different crystal lattice is formed; namely the tetragonal arrangement of ions characteristic of $SrO_2$ in which the axes of the $O_2^=$ ions are parallel and coincident with the unique crystal axis. Thus, the $SrO_2$ nucleates and grows at the expense of the SrO phase. In order that such changes be able to occur, diffusion of the various ions and of species related to oxygen must take place.

It is believed that the presence of the incorporated foreign metal ions may effect the above mentioned fundamental processes in the following manner. They may comprise additional nuclei for more rapid nucleation and growth or they may promote diffusion processes by introducing more imperfections in the reacting solids. The foreign metal ions may also catalyze electron transfers involved in the ionic redox reactions. Any or all of these processes may be effected by the incorporated foreign metal ions.

The rate at which a reaction mass responds to changes in pressure and temperature will also depend on the velocities with which the above four fundamental processes can occur. These processes depend not only on pressure and temperature, but also on such factors as extent of reaction, composition, and thermochemical history. Consequently, the rate at which a reaction mass based on the system $SrO_2$-SrO-$O_2$ approaches a stable state will also be sensitive to these factors.

Reaction rates

The rate of approach to a stable thermodynamic state may be specified in various ways. The most meaningful way—in practical sense—is to define the reaction rate as the change in weight of the reaction mass with time due to the release of oxygen on dissociation (dissociation rate), or due to the uptake of oxygen on oxidation (oxidation rate). If a plot of weight change versus time is made, the reaction rate corresponds to the slope of the resulting curve. In most cases, this curve is not a straight line, so that the slope is different at different values of weight change or time. The reaction rate in these instances changes during the course of the reaction. Convenient units for expressing both rates of oxidation and dissociation are wt. percent of the fully *oxidized* reaction mass gained or lost respectively per minute.

Experimental values of the reaction rates have been measured under isothermal and nearly isobaric conditions, in order to simplify both the control of variables and the interpretation of results. The dependence on temperature and pressure can be assessed from measurements of reaction rates at various values of these variables. The dependence of reaction rates on factors other than temperature and pressure become apparent from measurements of rates at fixed values of temperature and pressure. Since the reaction masses are intended for use in cyclic processes, the oxidation and dissociation rates have usually been measured in pairs, at constant temperature and fixed (but different) pressures for dissociation and oxidation. Usually the dissociation and oxidation have each been allowed to proceed to completion, though this need not be the case.

The detailed procedure for measuring rates will vary with the type of apparatus used, but will include: (a) removing sorbed gases and/or vapors, (b) heating the sample to the desired reaction temperature, and (c) cycling the sample until reproducible rate data is obtained. Step (a) may be omitted or combined with step (b) in some measuring techniques.

The sample can be brought to the reaction temperature in several ways: (1) by heating in vacuum, (2) under static $O_2$ pressure, or (3) in a flowing stream of $O_2$ or air. The first of these leads to samples in which the reactive part of the reaction mass is SrO, while the latter two can lead to $SrO_2$ or mixtures of $SrO_2$ and SrO, depending on the $O_2$ pressure. Once the reaction temperature is reached, reaction is initiated by reducing the $O_2$ pressure below $P_e$ to dissociate or by increasing it above $P_e$ to oxidize the sample.

Various methods may be used to determine the amount of $O_2$ released or taken up with time. Gravimetric techniques measure directly the sample weight during reaction. The reactions may be performed at essentially constant $O_2$ pressure, and other reactions (during heatup, for example) leading to weight changes can be monitored. Manometric techniques, in which the cahnge in $O_2$ pressure at constant volume is measured, may also be employed. In this method, truly isobaric rates cannot be obtained, but the sample size and reactor volume can be adjusted so that the changes in $O_2$ pressure during reaction is small compared to the average pressure. The change in sample weight is calculated from the change in $O_2$ pressure using the gas laws.

Reaction rates measured in this way show the strong dependence of the rate in each direction on the extent of reaction. The extent of reaction is determined by two factors: (1) the total amount of the reaction mass which can participate in the dissociation-oxidation cycle, conveniently expressed as weight percent of the fully oxidized reaction mass, and (2) the amount of the reaction mass that has reacted at a given point during the course of the reaction, expressed in the same terms. The total amount of a given reaction mass available for reaction under specified conditions is called the "reactive range" or "maximum oxygen loading." The highest value of reactive range for masses based on the system $SrO_2$-$SrO$-$O_2$ is 13.37 weight percent of the fully oxidized reaction mass, corresponding to pure $SrO_2$. This number is arrived at simply from knowledge of the molecular weights of $SrO_2$ and $O_2$ and of the fact that only one oxygen atom of the peroxide ion is liberated on dissociation. Thus, for each gram-mole of $SrO_2$ (119.63 grams), one-half gram-mole of $O_2$ molecules (16.00 grams) can be liberated, or $$(16.00/119.63) \times 100 = 13.37 \text{ weight percent}$$

In other words, the maximum amount of oxygen which can theoretically be liberated on decomposition of pure strontium peroxide is equal to 13.37% (by weight) of the peroxide.

For the reaction masses of interest, The reactive range is usually less, due to the presence of other substances deliberately or inadvertently incorporated. In actual practice, the reactive range is found to be about 8 to 9 weight percent, rather than 13.37 weight percent expected for pure $SrO_2$. The difference between the actual and theoretical percentages is caused by the fact that not all of the strontium in the reaction mass is composed of strontium oxide or peroxide and therefore all of the strontium does not take part in the oxidation and dissociation reactions. The unreactive strontium in the reaction mass is composed primarily of $Sr(OH)_2$ and some $SrCO_3$. The foreign cations are also present, but crystalline phases containing these cations have not been detected. Compounds of strontium which do not participate in the oxidation and dissociation reaction, such as the hydroxide and carbonate, may be formed (1) in the preparation of the $SrO_2 \cdot 8H_2O$, (2) during conversion of this compound to $SrO_2$, (3) when the material is being brought to reaction temperature, or (4) during redox cycling. Although the formation of appreciable amounts of $Sr(OH)_2$ is ordinarily not detected until the sample has been heated to temperatures in the range 250° to 300° C. Crystalline $Sr(OH)_2$ might be formed from $OH^-$ ions incorporated along with the foreign cations, or by reaction of strongly bound water with peroxide ions, or by both these processes.

Figure 2:
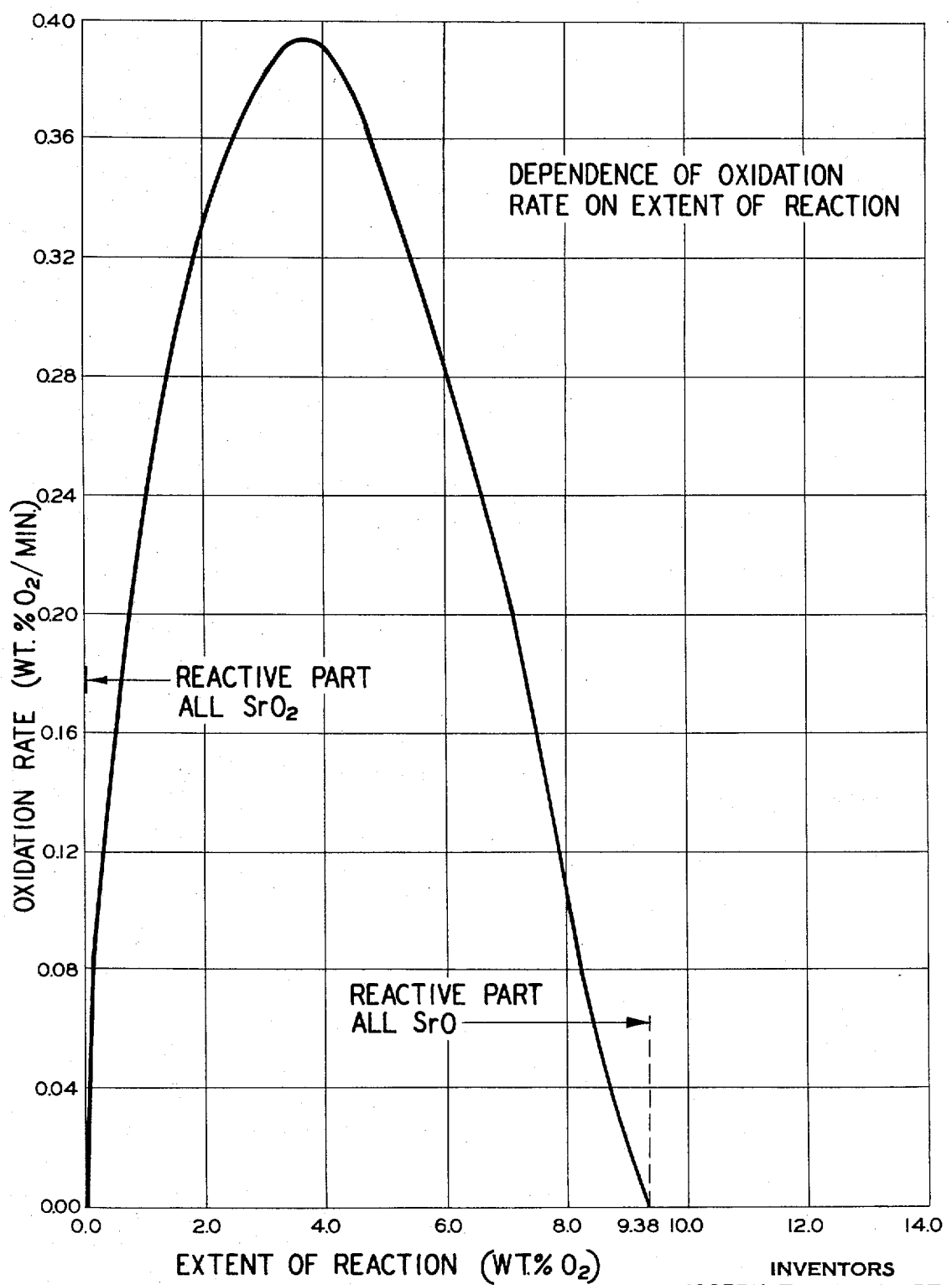
FIG. 2 is a graph showing the dependence of the oxidation rate of strontium oxide on the extent of the oxidation which has already taken place.
Figure 3:
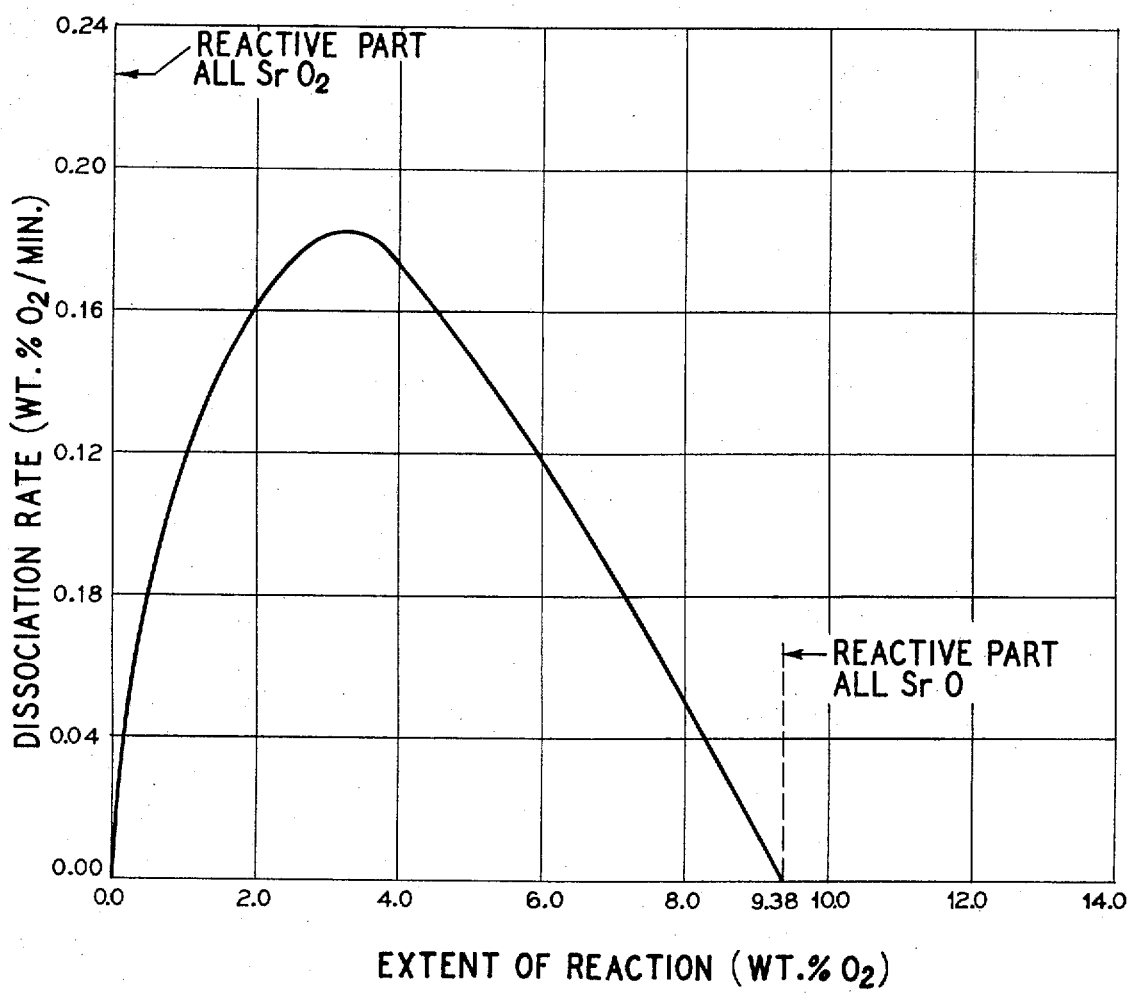
FIG. 3 is a graph showing the dependence of the dissociation rate of strontium peroxide on the extent of the reduction which has already taken place.

The rate curves shown in FIGS. 2 and 3 illustrate the dependence of the reaction rates on the extent of reaction. The curve shapes, reactive ranges, and average rates of dissociation and oxidation are typical of reaction masses of practical interest.

FIG. 2 is a plot of the oxidation rate (weight percent of the fully oxidized mass gained by the sample per minute) against the extent of reaction (weight percent of the fully oxidized mass based on the weight of the oxidized sample). The left end of the abscissa represents the reaction mass when the reactive part of the reactive mass is all $SrO_2$. It will be seen that the reaction rate increases steadily until about 3.6 weight percent $O_2$ has been absorbed and that thereafter the oxidation rate drops steadily until it reaches zero at about 9.4 weight percent.

The reaction mass used to obtain the data in FIGS. 2 and 3 contained 4.9 mole percent copper, 3.3 mole percent sodium and 21.8 mole percent $Sr(OH)_2$. The reaction mass, which had a reactive range of 9.38% was cycled at 325° C. under an oxidation pressure of 800 torr and a dissociation pressure of 160 torr. The average oxidation rate obtained was 0.248 wt. percent per minute, while the specific average oxidation rate was 0.406 wt. percent per minute per atmosphere.

FIG. 3 shows the dependence of the dissociation rate on the extent of reaction of the same mass of material as used to obtain the graph in FIG. 2. The average dissociation rate obtained was 0.112 wt. percent per minute and the specific average dissociation rate was 0.482 wt. percent per minute per atmosphere.

Because the rates change during the course of reaction the extent of reaction is not usually known explicitly, the sociation and oxidation over the reactive range. The average reaction rate characterizes with a single value each curve of rate versus extent of reaction and is defined as (1) the mathematical integral of the reaction rate (expressed as a function of the extent of reaction) evaluated over the reactive range, divided by (2) the mathematical integral over the reactive range. The average or mean rates are obtained by conventional mathematical techniques. Since the functional dependence of rate on the extent of reaction is not usually known explicitly, the average reaction rates have been evaluated by a conventional approximation technique shown on page 167 of Wilfred Kaplan "Advanced Calculus" Addison-Wesley Press (1952).

For a given reaction mass, the dependences of rates of dissociation and oxidation, as well as the average values of these rates, change appreciably during the first few cycles, even though the same temperature and pressure conditions are used for each cycle. Consequently, samples are cycled repeatedly until the rate curves and average values can be reproduced. In the present disclosure only reproducible rate curves and reproducible average rates are used to characterize a given reaction mass at specified conditions.

It is useful to take account of the driving force when discussing rates, especially when rates for different reaction masses, or rates for a given mass under different conditions are compared. Since most reaction rates are measured isothermally, it is convenient to define a *specific* reaction rate as the rate per unit pressure driving force. The pressure driving force under isothermal conditions is the difference between the equilibrium oxygen pressure and the applied oxygen pressure. The rate used throughout the present specification and claims is the *specific, reproducible, average rate*. It is defined as the reproducible, average rate per unit pressure driving force obtained isothermally over the full reactive range. The units for this rate are weight percent of the fully oxidized reaction mass, per minute, per atmosphere of oxygen pressure.

PREPARATION OF STRONTIUM OXIDE-PEROXIDE MASS CONTAINING FOREIGN METAL IONS

In general, the solid crystalline strontium oxide-peroxide reaction mass of the present invention is prepared by forming an aqueous solution of strontium ions and ions of the foreign metal which is to be incorporated into the reaction mass. An aqueous alkaline peroxide solution is used to oxidize the strontium ions in solution to the peroxide and to precipitate the peroxide. This precipitate is a mixture which consists predominantly of strontium peroxide octahydrate ($SrO_2 \cdot 8H_2O$) containing the foreign metal ions incorporated in co-precipitated form therewith. Ordinarily, however, small amounts of strontium hydroxide octahydrate ($Sr(OH)_2 \cdot 8H_2O$) are also present in the precipitate. The precipitate is separated from the aqueous solution by filtration and dried until the material becomes essentially anhydrous. The dried product consists predominantly of strontium peroxide containing the added metal ions, as well as small amounts of strontium hydroxide.

It should be apparent that the method for preparing the above product will vary somewhat depending upon the specific metal ions which are to be incorporated into the strontium oxide-peroxide reaction mass. Metal ions which form insoluble hydroxides are easily co-precipitated with the strontium and therefore more readily occluded by the strontium peroxide than are metal ions which are soluble in the reagent mixture. However, even the metal ions which form soluble hydroxides will be occluded in the strontium peroxide to some extent. In such case an excess of the metal ion must be used, since only a small portion of the ions added in the solution will become occluded in the precipitation.

It will be evident to those skilled in the art that some variations in preparation are possible, and even necessary in order to incorporate certain foreign metal ions into the strontium oxide-peroxide reaction mass. For example, strontium peroxide may be precipitated by introducing hydrogen peroxide into an ammoniacal solution of strontium and soluble salts of the metal ion, provided that the metal ions are soluble in the ammoniacal solution. Ammonia may inhibit the incorporation of certain transition metal ions by forming soluble ammine complexes. For this reason, strontium peroxide containing one or more of such metal ions is prepared by reaction with an alkali hydroxide solution.

As noted before, the strontium peroxide product contains strontium hydroxide in addition to the introduced foreign metal ions. It is formed by reaction of a small fraction of the strontium peroxide with water during the preparation and drying steps. The presence of some hydroxide (on the order of about 5 mole percent) in the reaction mass is preferred, since it enhances the reaction rates of the strontium oxide-peroxide reaction mass.

It has been found that if the solutions used in making the strontium peroxide are cooled prior to and during mixing, the amount of strontium hydroxide found in the product after drying and heating to reaction temperature is usually less than half of the total strontium present. Formation of a larger fraction of hydroxide is undesirable because it lowers the capacity of the reaction mass for separating oxygen by preventing the strontium from taking part in the reversible oxidation-dissociation reaction.

The following specific examples are given for purposes of illustration only in order to demonstrate methods for preparing the solid crystalline strontium oxide-peroxide masses containing foreign metal ions, and having increased reaction rates in accordance with the present invention.

EXAMPLE I

Preparation of $SrO_2$ containing 3 mole percent Na

The apparatus used consisted of a 500 ml. capacity reactor containing a stoppered access opening, an inlet and outlet for inert gas, purging and a thermometer. Stirring was accomplished with a magnetic stirrer. 15.6 grams (approximately 0.2 mole) of sodium peroxide ($Na_2O_2$) were dissolved in 175 ml. of distilled water while the solution was cooled in an ice bath. 53.4 grams (approximately 0.2 mole) of strontium chloride hexahydrate ($SrCl_2 \cdot 6H_2O$) were then dissolved in 60 ml. of distilled water and cooled in an ice bath. The sodium peroxide solution was poured into the reactor and the strontium chloride solution thereafter added with vigorous stirring. A thick slurry of white solids was precipitated immediately. The slurry was transferred to a 500 ml. fritted glass filter and filtered by means of a water aspirator vacuum while being protected from atmospheric carbon dioxide by a gaseous nitrogen blanket. The solids were washed with distilled water until the filtrate no longer showed the presence of any chloride ion by the silver nitrate test. The solids were then washed three additional times with 200 ml. of ethyl alcohol to remove the surface water, and twice with 200 ml. of diethyl ether to remove the alcohol. Suction was continued until the ether was removed.

A sample of the solid material analyzed by X-ray diffraction analysis was identified as strontium peroxide octahydrate. The remaining product was dehydrated in a vacuum desiccator over activated CaA zeolite. The product weighed 23.7 grams after dehydration which was close to the theoretical weight of 24 grams. Analysis of the dehydrated product by X-ray diffraction showed this material to be strontium peroxide ($SrO_2$). However, the peaks of the X-ray spectrum were broadened, and their heights were about 20% lower than the peak heights observed with pure strontium peroxide. The amount of sodium present was determined by atomic absorption spectrophotometry.

EXAMPLE II

Preparation of $SrO_2$ containing 4 mole percent Na and 5 mole percent Cu

The same type of apparatus was used as in Example I above, except that the volume of the reactor was quadrupled and a motor driven stirrer was used. 200 ml. of the distilled water was added to the regulator and cooled by an external ice bath. 16.3 grams (about 0.21 mole) of sodium peroxide was added and stirred until dissolved and the temperature of the solution decreased to about 0° C. A mixture of 1.70 grams (0.01 mole) of cupric chloride dihydrate ($CuCl_2 \cdot 2H_2O$) and 50.0 grams (0.19 mole) of strontium chloride hexahydrate ($SrCl_2 \cdot 6H_2O$) was dissolved in 200 ml. distilled water and the solution cooled in an ice bath. This solution was added to the reactor with stirring. An olive-green precipitate formed immediately. The slurry was transferred to a 500 ml. fritted glass filter and filtered by suction from a water aspirator. The product was protected from atmospheric $CO_2$ by a gaseous nitrogen blanket. It was washed first with 200 ml. ethyl alcohol and then with 100 ml. diethyl ether. Suction was continued until the ether was removed.

A sample of the product was identified by X-ray diffraction as strontium peroxide octahydrate ($SrO_2 \cdot 8H_2O$). The remaining sample was dehydrated in a vacuum desiccator over activated CaA zeolite. The dehydrated product which was blue-green in color, was identified as strontium peroxide ($SrO_2$) by X-ray diffraction analysis. The peaks of its X-ray spectrum were broadened and their heights were about 30% lower than the peak heights observed with pure strontium peroxide. The percentages of copper and sodium in the peroxide were determined by atomic absorption spectrophotometry.

EXAMPLE III

Preparation of $SrO_2$ containing 4 mole percent Na, 3 mole percent Cu and 0.05 mole percent Ag Using apparatus as in Example II above, 250 ml. of distilled water was introduced into the reactor and cooled by an external ice bath. 20.5 grams (about 0.26 mole) of sodium peroxide were added and stirred until dissolved and the temperature fell to about 0° C. A mixture of 125 ml. of 1.5 N strontium nitrate ($Sr(NO_3)_2$) (0.19 mole), 60 ml. of 0.1 N copper nitrate ($Cu(NO_3)_2$) (0.006 mole), and 10 ml. of 0.01 N silver nitrate ($AgNO_3$) (0.0001 mole) which had been cooled to 0° C. was added with stirring. An olive-green precipitate formed immediately. The slurry was transferred to a 500 ml. fritted glass filter and filtered by suction from a water aspirator. The product was protected from atmospheric $CO_2$ by a nitrogen blanket, washed first with 200 ml. ethyl alcohol and then with 100 ml. diethyl ether. Suction was continued until the ether was removed.

A sample of the product was identified by X-ray diffraction analysis as strontium peroxide octahydrate ($SrO_2 \cdot 8H_2O$). The remaining sample was dehydrated in a vacuum desiccator over activated CaA zeolite. The dehydrated product was blue-grey in color and identified as strontium peroxide ($SrO_2$) by X-ray diffraction analysis. The peaks of the X-ray spectrum obtained were broadened, and their heights were about 25% lower than the peak heights observed with pure strontium peroxide. The amount of occluded sodium, copper and silver were analyzed by atomic absorption spectrophotometry.

EXAMPLE IV

Preparation of $SrO_2$ containing 6 mole percent Na, 2 mole percent Cu, and 1 mole percent Ni Using the same apparatus as in Example I above, except that the volume of the reactor was increased to 5 liters and a motor driven stirrer was used, a mixture of 192 ml. of 2 N strontium nitrate (0.38 mole), 120 ml. of 0.1 N copper nitrate (0.012 mole) and 40 ml. of 0.1 N nickel nitrate ($Ni(NO_3)_2$) (0.004 mole) was introduced into the reactor and cooled to $-2°$ C. by an external ice-brine bath. A mixture of 500 ml. of 2 N sodium hydroxide (1 mole) and 70 ml. of 30% hydrogen peroxide (about 0.7 mole) was cooled to about 5° C. in an external ice bath and added to the reactor with stirring. An olive-green precipitate formel immediately. The slurry was transferred to a 500 ml. fritted glass filter and filtered by suction from a water aspirator. The product was protected from atmospheric $CO_2$ by an argon blanket, and washed twice with 250 ml. water cooled to near 0° C.

The sample was dried in a vacuum desiccator over activated CaX zeolite. The dehydrated product which was blue-grey in color, was identified as strontium peroxide by X-ray diffraction analysis. The peaks of the X-ray spectrum obtained were broadened and their heights were about 20% lower than the peak heights observed with pure strontium peroxide. The percentages of these foreign ions were determined by atomic absorption spectrophotometry.

EXAMPLE V

Preparation of $SrO_2$ containing 5.1 mole percent K and 5.8 mole percent Fe

Using the same apparatus as in Example IV above, a solution of 79.5 g. $Sr(NO_3)_2$ (0.375 mole) and 4.8 g. $FeCl_2 \cdot 4H_2O$ (0.024 mole) in 600 ml. water was introduced into the reactor and cooled to $-3°$ C. by an external ice-brine bath. A mixture of 250 ml. 4 MKOH (1 mole) and 50 ml. of 30% hydrogen peroxide (about 0.5 mole) was cooled to about 5° C. in an external ice bath and then added to the reactor with stirring. A light-brown precipitate formed immediately. The slurry was transferred to a 500 ml. fritted glass filter and filtered by suction from a water aspirator. The product was protected from atmospheric $CO_2$ by an argon blanket and washed twice with 250 ml. water cooled to near 0° C.

The sample was dried in a vacuum desiccator over activated CaX zeolite. The dehydrated product which was light brown in color, was identified as strontium peroxide by X-ray diffraction analysis. The peaks of the X-ray spectrum obtained were broadened and their heights were about 20% lower than the peak heights observed with pure strontium peroxide. The percentages of these foreign ions were determined by atomic absorption spectrophotometry.

Tabulated results

Table I below demonstrates the great increases in oxidation rate and reduction rate which have been obtained by the incorporation of foreign metal ions (i.e. cations) selected from Groups I-A, I-B and VIII of the Deming periodic table of the elements into the strontium oxide-peroxide reaction mass.

In Table I, and throughout the disclosure, the hydroxyl content (OH) of the examples is given as mole percent strontium hydroxide ($Sr(OH)_2$) and calculated on the assumption that the mass contains active strontium (namely, strontium oxide and strontium peroxide) and that all the inactive strontium (i.e. strontium which does not undergo the redox reaction) is present as strontium hydroxide. The total amount of strontium is determined analytically and the strontium in the active oxide forms is calculated from the maximum reversible oxygen loading. The remaining stronium is then assumed for purposes of the calculation to be present as the hydroxide.

The specific, reproducible, average oxidation and reduction rates, as heretofore defined, have the units of weight percent change per minute per atmosphere $O_2$ pressure. In all cases the rates shown in Table I were measured at a temperature of 325° C., the oxidation pressure was maintained at 800 torr, and the pressure during dissociation was maintained at 160 torr.

TABLE I

| Example No. | (OH) | Added metal ions (gm. mole per 100 gm. moles total metal ions) | | | | | | | Total groups I-B and VIII | Total of all added ions | Oxidation | | Dissociation | |
|---|---|---|---|---|---|---|---|---|---|---|---|---|---|---|
| | | Group I-A | | Group I-B | | Group VIII | | | | | Rate [1] | Improvement (fold) | Rate [1] | Improvement (fold) |
| | | Na | K | Cu | Ag | Fe | Co | Ni | | | | | | |
| Blank | 8.7 | | | | | | | | 0.0 | 0.0 | 0.002 | | 0.002 | |
| 1 | 9.2 | 11.0 | | | | | | | 0.0 | 11.0 | 0.020 | | 0.017 | |
| 2 | 26.2 | 0.4 | | | | 3.7 | | | 3.7 | 4.1 | 0.020 | 10 | 0.017 | 8 |
| 3 | 32.1 | 10.8 | | | | | | | 0.0 | 10.8 | 0.020 | 10 | 0.017 | 8 |
| 4 | 22.0 | 13.0 | | | | | 2.7 | | 2.7 | 13.5 | 0.48 | 240 | 0.43 | 215 |
| 5 | 28.6 | 10.6 | | | | | | 2.7 | 2.7 | 15.7 | 0.30 | 150 | 0.26 | 130 |
| 6 | 15.0 | 10.3 | | 2.5 | | | | | 2.5 | 13.1 | 0.56 | 280 | 0.86 | 430 |
| 7 | 29.0 | 8.7 | | | | 1.1 | | | 1.1 | 11.4 | 0.31 | 155 | 0.56 | 280 |
| 8 | 26.8 | 7.3 | | | | 3.0 | | | 3.0 | 11.7 | 0.94 | 470 | 0.51 | 255 |
| 9 | 30.1 | 10.1 | | | | 4.9 | | | 4.9 | 12.2 | 1.10 | 550 | 1.10 | 550 |
| 10 | 29.8 | 7.3 | | | | 6.3 | | | 6.3 | 16.4 | 1.00 | 500 | 0.90 | 450 |
| 11 | 26.9 | | | | | 8.3 | | | 8.3 | 15.6 | 0.91 | 455 | 0.43 | 215 |
| 12 | 56.4 | 11.6 | 5.1 | | | 5.8 | | | 5.8 | 10.9 | 0.25 | 125 | 0.12 | 60 |
| 13 | 79.8 | 8.7 | | 2.7 | | 2.7 | | 1.0 | 6.4 | 18.0 | 0.86 | 430 | 0.73 | 365 |
| 14 | 42.1 | 7.4 | | | | | 3.3 | | 3.3 | 12.0 | 0.44 | 220 | 0.21 | 105 |
| 15 | 35.5 | 6.7 | | 3.2 | | | | 1.0 | 4.2 | 11.6 | 0.84 | 420 | 0.64 | 320 |
| 16 | 44.6 | 7.1 | | 3.3 | | | | 1.0 | 4.3 | 11.0 | 0.83 | 415 | 0.39 | 195 |
| 17 | 44.7 | 6.8 | | 3.0 | | | | 1.1 | 4.4 | 11.5 | 0.79 | 395 | 0.47 | 235 |
| 18 | 35.9 | 6.9 | | 3.1 | | | | 1.1 | 4.2 | 11.0 | 0.79 | 395 | 0.39 | 195 |
| 19 | 30.9 | 8.3 | | 5.1 | | | | 1.0 | 6.1 | 13.0 | 1.02 | 510 | 0.43 | 215 |
| 20 | 34.2 | 7.3 | | 5.1 | | | | 1.0 | 6.1 | 14.4 | 1.01 | 505 | 0.47 | 235 |
| 21 | 28.6 | 9.2 | | 5.1 | | | | 1.0 | 6.1 | 13.4 | 1.19 | 559 | 0.39 | 195 |
| 22 | 47.7 | 8.2 | | 5.2 | | | | 0.9 | 6.1 | 15.3 | 1.10 | 550 | 0.43 | 215 |
| 23 | 49.1 | 7.5 | | 15.9 | | | | 0.9 | 16.8 | 25.0 | 1.20 | 600 | 1.63 | 815 |
| 24 | 14.5 | 11.5 | | 20.5 | | | | 0.9 | 20.4 | 27.9 | 0.95 | 475 | 0.64 | 320 |
| 25 | 38.6 | 10.5 | | | 1.1 | | | | 1.1 | 12.6 | 0.08 | 40 | 0.17 | 85 |
| 26 | 35.9 | 8.5 | | 4.8 | 0.1 | | | 1.0 | 5.9 | 16.4 | 1.22 | 610 | 0.43 | 215 |
| 27 | 19.6 | | 3.3 | 4.6 | 1.1 | | | 1.0 | 6.7 | 15.2 | 1.12 | 610 | 1.07 | 535 |
| | | | | 4.7 | | | | 0.9 | 5.6 | 8.9 | 0.31 | 155 | 0.08 | 40 |

[1] Specific, reproducible average rate. Units are wt. percent per minute per atmosphere $O_2$ pressure.

The first (unnumbered) example given in Table I is a blank, that is, no foreign metal ions were added to the strontium oxide-peroxide reaction mass. It will be seen that its oxidation and dissociation rates are extremely low. By contrast, it can be seen that oxidation rates which are over 600 times faster than the blank have been obtained, and that dissociation rates which are over 800 times faster than blank have been achieved. Furthermore, even the slowest reaction rates of the reaction masses of the present invention shown in Table I exhibited a ten fold (1000%) improvement in oxidation rate and an eight fold (800%) improvement in dissociation rate. As can be seen from Table I, a variety of metal cations including sodium, potassium, copper, silver, iron, cobalt and nickel have been used as the foreign ions incorporated into the strontium oxide-peroxide reaction mass. It will also be seen from Table I that in every case the amount of strontium hydroxide (measured after cycling) contained in the reaction mass was appreciable, ranging from 8.7 to as much as 79.8% of the sample. The presence of excessive amounts of strontium hydroxide is not desirable, since it does not participate in the oxidation-reduction cycle—and consequently, lowers the efficiency of the reaction mass as an oxygen carrier.

It can further be seen from Table I that the magnitude of the increase in the reaction rates depends upon (1) the specific foreign metal cations which have been incorporated, (2) their concentration, as well as (3) the particular combination of ions used. Optimum reaction rates have been achieved by a combination of one metal ion from Group I-A together with at least one additional metal ion from Group I-B or Group VIII. The fastest rates have been achieved by a combination of sodium, copper and nickel ions. However, the achievement of optimum reaction rates is a matter which lies within the skill of the art, once the general concept of the present invention is known, namely, the incorporation of these foreign metal ions into the $SrO$-$SrO_2$ reaction mass.

In order to determine the effect that incorporation of very low concentrations of foreign metal ions (compared to that shown in Table I) has upon the reaction rates of the strontium oxide-peroxide reaction system, a series of sample reaction masses were prepared containing only about 1–2% iron and less than 1% sodium. The reaction rate for these samples are shown, in Table II below to be slower than the rates for the samples shown in Table I, by an order of magnitude or more. In order, therefore, to be able to obtain the necessary rate data within reasonable test times (that is, days rather than weeks), the reactions had to be run at varied higher oxidation pressures and at varied lower dissociation pressures than the samples in Table I. All examples shown in Table II were run at 325° C., the same as the examples in Table I. The specific oxidation and dissociation pressures used to obtain and the reaction rates for Examples 28–30 are shown in the last two columns of Table II.

value and validity. It can be seen from Table II that even very low concentrations of metal ions will increase the oxidation and dissociation rates appreciably. Thus, it can be seen from Example 28 that 0.3 mole percent sodium alone will increase the oxidation rate 6 fold (600%) and the dissociation rate 8 fold (800%). Likewise, Example 30 shows that the use of 2 mole percent iron alone will produce a 5.5 fold (550%) increase in the oxidation rate, and a 3.5 fold (350%) increase in the dissociation rate, as compared to the blank containing no added metal ions. Therefore, it can be seen that even very low concentrations on the order of 0.3 mole percent added metal ion will cause a several hundred percent increase in the reaction rates.

Air separation

As previously mentioned, the strontium oxide-peroxide reaction mass containing the foreign metal ions is particularly useful for the separation of oxygen from an oxygen containing gas mixture such as air. The steps required for such a process consist, basically, of first contacting the oxygen containing gas mixture with the solid crystalline reaction mass of the present invention at such temperature and pressure that the equilibrium driving force will cause oxidation of at least a portion of the mass to strontium peroxide, thereafter the oxygen-depleted gas mixture is separated from the oxidized reaction mass, and the reaction mass then dissociated to liberate the oxygen—thereby reducing at least a portion of the reaction mass to strontium oxide. The liberated oxygen is then separated from the reduced solid and the cycle repeated.

It will be apparent to those skilled in the art that a large variety of specific techniques may be used for accomplishing the above separation of oxygen from air. Thus, the solid reaction mass may be composed of a stationary bed, and the conditions surrounding the bed cyclically varied. Alternatively, the reaction mass may be transported through alternating oxidation and reduction zones.

If a static bed of the reaction mass is used, cycling may be accomplished by varying the temperature, pressure or both in order to cause oxidation and reduction of the reaction mass. It should also be apparent that the cycling may be carried out without driving the entire reaction mass to the peroxide form during the oxidation step, or completely to the oxide form during the reduction step. That is, cycling may be done so as to drive the reaction mass only partially to the oxide and then partially to the peroxide during each cycle in order to take advantge of the optimum reaction rates. Furthermore, a plurality of reactors may be used in combination in order to make the process continuous. That is, one reactor may be in the oxidation stage while a second is in the reduction stage. Thereafter, the cycles are reversed in each reactor. Since the oxidation rate and the reduction rate do not proceed at the same absolute rate, it may also be desirable to

TABLE II

| Example No. | (OH) | Added metal ion [1] Na | Fe | Oxidation Rate [2] | Improvement (fold) | Dissociation Rate [2] | Improvement (fold) | Oxidation pressure (torr) | Dissociation pressure (torr) |
|---|---|---|---|---|---|---|---|---|---|
| Blank | 8.7 | | | .002 | | .002 | | 800 | 160 |
| 28 | 8.9 | 0.3 | | .012 | 6.0 | .017 | 8.5 | 1,800 | 20 |
| 29 | 9.3 | 0.3 | 0.7 | .014 | 7.0 | .019 | 9.5 | 1,920 | 20 |
| 30 | 12.5 | | 2.0 | .011 | 5.5 | .007 | 3.5 | 2,000 | 20 |

[1] Moles per 100 moles of metal ions.
[2] Specific, reproducible average rate. Units are wt. percent per minute per atmosphere $O_2$ pressure.

It should be noted that comparisons of reaction rates of the samples shown in Table II are not as precise a comparison as that given in Table I, because the reaction conditions (i.e. the oxidation and reaction pressures) are not identical for all of the examples within Table II, whereas they were identical for all of the examples in Table I. Nevertheless, a comparison of the reaction rates with the blank (the same as the blank in Table I) has use, for example, one reactor for oxidation and two reactors for dissociation.

In addition to the use of static bed reactors, the reaction mass of the present invention may readily be adapted to a fluidized bed process wherein the reaction mass is transported alternately through oxidation and reduction zones. The fluidization medium may be either gaseous or liquid.

EXAMPLE A

Figure 4:
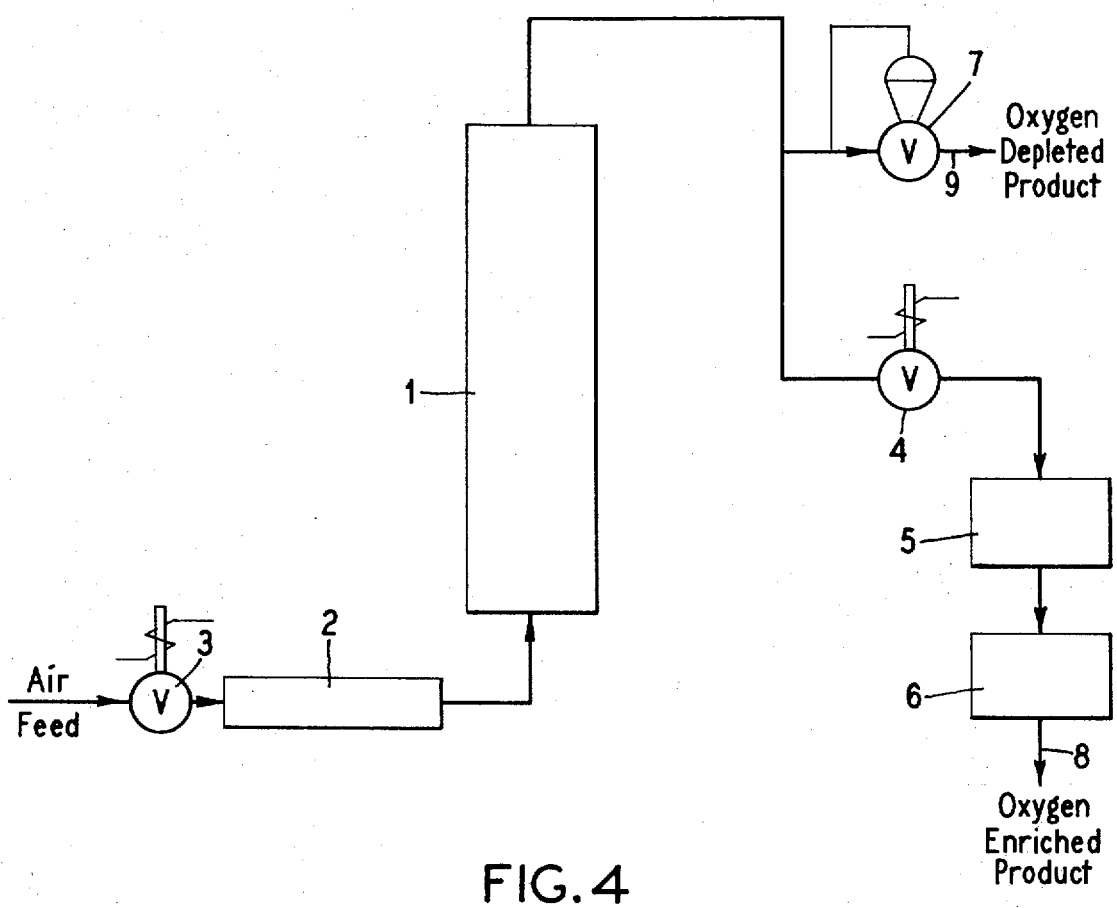
FIG. 4 is schematic flow diagram showing the operation of an air separation process for producing oxygen in accordane with the present invention.

The following example is illustrative of the operation of an air separation process using the novel strontium oxide-peroxide reaction mass of this invention. Oxygen was separated from air in a pressure swing cycle conducted in automated apparatus as shown in FIG. 4. The strontium oxide-peroxide reaction mass contained 5 mole percent copper, 0.1 mole percent silver, and about 4 mole percent sodium. The vacuum dried powder was screened and the 10 x 30 U.S. standard mesh fraction was then heated to 346° C. over a 24-hour period with 16 vacuum-pressure purges of oxygen to 60–90 p.s.i.g. This oxygen treated fraction analyzed to be 54.3 weight percent strontium peroxide.

Referring to FIG. 4, it can be seen that a reactor chamber 1 which is constructed of a 16-inch length of 1 inch O.D. schedule 40 stainless steel tubing within a controlled temperature electric resistance tube heater (not shown) is charged in its middle 12-inch long region with 161.7 grams of the reaction mass described above. Air feed, purified of $CO_2$ by passing it over activated charcoal and crystalline zeolitic molecular sieve adsorbent having a pore size of about 10 A., is supplied through a preheater 2 to the inlet end of reactor 1 during the oxidation stage through a solenoid valve 3. The product fractions exit at the discharge end of reactor 1 through automatic valves 4 and 7. One valve 4, a solenoid valve is connected to a vacuum (190 torr) product reservoir 5 equipped with a vacuum pump 6 and the other valve 7 which is an automatic back-pressure valve, is vented to the atmosphere. Continuous oxygen analyzers (not shown) were connected to both product streams 8 and 9. The automatic valves 3, 4 and 7 on the air inlet and product streams are controlled by a timing circuit (not shown) to regulate the start, duration and end of the oxidation and the dissociation stages of the pressure swing cycle.

The functioning of the pressure swing apparatus was studied for a total of 236 oxidation-dissociation cycles at various air-feed rates and cycle timing and was then operated an additional 128 cycles with the orginal strontium oxide-peroxide mass at the following conditions. During the oxidation stage of each cycle the air feed flow rate was 0.008 cu. ft. (STP)/min. at 3800 torr for 21.8 minutes; reactor temperature was 325° C.; each dissociation stage was at 190 torr for 31.6 minutes.

During the air feed (oxidation stage) of the pressure-swing cycle (valves 3 and 7 are open and 4 is closed), the reaction mass took up oxygen from the air feed, and the oxygen depleted product stream exited through the automatic back-pressure valve 7 which maintained the reactor pressure at 3800 torr. Then during the low pressure, dissociation stage (during which valves 3 and 7 are closed and 4 is open) the oxidized reaction mass in reactor 1 dissociated to give off the oxygen taken up during the oxidation stage as a highly concentrated (better than 99.5% purity) oxygen stream. The oxygen analyzer which monitored the oxygen-depleted product stream 9 leaving the automatic back-pressure valve 7 during the oxidation stage showed that the oxygen content of the oxygen-depleted product stream 9 dropped to 15–17 volume percent within the first 5 minutes after oxidation stage flow was established, and that the oxygen content continued to drop throughout the balance of the 21.8 minutes of that stage to 11–12 volume percent oxygen. No impairment of this performance was observable at the end of 128 cycles, when the pressure swing process test was deemed to function satisfactorily and the test run was then terminated.

While use of the strontium oxide-peroxide reaction mass of the present invention has been described above primarily as it relates to a flow-type air separation process for the manufacture of oxygen, it will be evident to those skilled in the art that the strontium peroxide reaction mass may also be used as a source of stored oxygen which can later be liberated at will. Thus, the novel strontium peroxide mass may be used as a "one-shot" oxygen source by decomposition, or it may be used as the oxygen carrier in a rechargeable oxygen source system, for example in a self-contained, portable breathing oxygen unit.

What is claimed is:

1. A method for increasing the reversible reaction rates of a solid substantially crystalline reaction mass comprising strontium oxide and strontium peroxide, by increasing both the oxidation rate of the strontium oxide to strontium peroxide, and of increasing the dissociation rate of the peroxide to strontium oxide and oxygen, comprising: incorporating into said strontium oxide-peroxide reaction mass at least 0.5 mole percent, based on the total number of moles of metal ions, of at least one ion of a metal selected from the group consisting of the elements of Groups I–A, I–B and VIII of the Deming periodic table.

2. The method of claim 1 wherein said reaction mass, in addition, comprises strontium hydroxide.

3. The method of claim 2 wherein at least 2 different metal ions are incorporated into said reaction mass, one of which is a Group I–A metal ion, and the other of which is a Group I–B or VIII metal ion.

4. The method of claim 3 wherein the amount of the metal ions incorporated is from about 1.0 to 20 mole percent based on the total number of moles of metal ions.

5. The method of claim 4 wherein the Group I–A metal ion is the sodium ion, and the ion from Group I–B or VIII is an ion selected from the group consisting of copper, silver, gold, iron, cobalt, nickel and mixtures thereof.

6. A method for separating oxygen from an oxygen containing gas mixture comprising the steps of:
   (1) contacting an oxygen containing gas mixture with a solid substantially crystalline reaction mass comprising a mixture of strontium oxide and strontium hydroxide containing therein at least 0.5 mole percent, based on the total number of moles of metal ions of at least one ion of a metal selected from the group consisting of the elements of Groups I–A, I–B and VIII of the Deming periodic table, thereby oxidizing at least a portion of the strontium oxide in said reaction mass to strontium peroxide;
   (2) separating the solid oxidized reaction mass from the oxygen-depleted gas mixture;
   (3) dissociating at least a portion of the strontium peroxide in said oxidized reaction mass, thereby reducing it to strontium oxide and liberating oxygen, and
   (4) separating said liberated oxygen from the reduced solid reaction mass.

7. The method of claim 6 wherein the oxygen containing gas mixture is air.

8. The method of claim 6 wherein the recited steps (1) to (4) are repeated in cyclic fashion.

9. The method of claim 6 wherein the reaction mass is in the form of a static bed.

10. The method of claim 6 wherein the reaction mass is alternately transported through oxidation and reduction zones.

11. A solid substantially crystalline reaction mass selected from the group consisting of the oxide, peroxide, and hydroxide of strontium and mixtures thereof, containing therein at least 0.5 mole percent, based on the total number of moles of metal ions of at least one ion of a metal selected from the group consisting of the elements of Groups I–A, I–B and VIII of the Deming periodic table.

12. A composition of claim 11 wherein said reaction mass is a mixture of strontium oxide, strontium peroxide and strontium hydroxide.

13. The composition of claim 11 wherein said reaction mass is substantially all strontium oxide.

14. The composition of claim 11 wherein said reaction mass is substantially all strontium peroxide.

15. The composition of claim 11 wherein said reaction mass is substantially all strontium hydroxide.

16. The composition of claim 11 wherein said reaction mass contains at least two different foreign metal ions, one of which is a Group I-A metal ion, and the other of which is a Group I-B or VIII metal ion.

17. The composition of claim 16 wherein said metal ions are present in an amount of from about 1.0 to 20 mole percent based on the total number of moles of metal ions.

18. The composition of claim 17 wherein the Group I-A metal ion is the sodium ion, and the ion from Group I-B or VIII is an ion selected from the group consisting of copper, silver, gold, iron, cobalt, nickel and mixtures thereof.

19. A method for preparing a solid substantially crystalline strontium oxide-peroxide reaction mass containing at least 0.5 mole percent, based on the total number of moles of metal ions, of at least one ion of a metal selected from the group consisting of the elements of Groups I-A, I-B and VIII of the Deming periodic table, comprising the steps of:
(1) contacting (a) an aqueous solution of strontium ions, (b) at least 0.5 mole percent, based on the total number of moles of metal ions, of at least one foreign ion of a metal selected from the group consisting of the elements of Groups I-A, I-B and VIII of the Deming periodic table, and (c) an aqueous, alkaline peroxide solution, thereby precipitating crystalline strontium peroxide octahydrate containing said foreign metal ions,
(2) separating the precipitated solid from the aqueous solution, and
(3) drying the solid substantially crystalline precipitate until a product consisting predominantly of anhydrous strontium hydroxide containing the added foreign metal ion is obtained.

20. The method of claim 19 wherein the precipitate formed in step (1) is a mixture of strontium peroxide octahydrate and strontium hydroxide octahydrate.

21. The method of claim 19 wherein the sequence of contacting solutions (a), (b) and (c) of step (1) is first mixing solutions (a) and (b), and thereafter contacting said mixed solution with solution (c).

22. The method of claim 19 wherein the sequence of contacting solutions (a), (b) and (c) of step (1) is first mixing solutions (b) and (c), and thereafter contacting said mixed solution with solution (a).

References Cited

UNITED STATES PATENTS

| | | | |
|---|---|---|---|
| 1,325,043 | 12/1919 | Pierce | 23—187 |
| 2,357,655 | 9/1944 | Hummel et al. | 23—187 |
| 3,324,654 | 6/1967 | Squires | 60—39.02 |

EARL C. THOMAS, Primary Examiner

U.S. Cl. X.R.

23—4, 187, 221; 252—186, 473, 475

PO-1050
(5/69)

UNITED STATES PATENT OFFICE
CERTIFICATE OF CORRECTION

Patent No. 3,579,292     Dated May 18, 1971

Inventor(s) J.T. Mullhaupt et al.

It is certified that error appears in the above-identified patent and that said Letters Patent are hereby corrected as shown below:

In col. 1, line 51, "relay" should read -- rely --.

Col. 1, line 58, "processes" should read -- process --.

Col. 1, line 64, "froming" should read -- forming --.

Col. 3, line 1, the first occurrence of "a" should read -- an --.

Col. 4, line 42, "accordane" should read -- accordance --.

Col. 4, line 58, "consideration" should read -- considerations --.

Col. 4, line 63, "inequilibrium" should read -- in equilibrium --.

Col. 4, lines 66-69, the formula should be on one line and read as follows:

$$\log P = -(19,290/4.571\ T) + 1.75 \log T - 0.0016\ T + 2.8$$

The formula in Col. 5, line 39 should read as follows:

$$O_2^= \rightleftarrows O^- + 1/2\ O_2$$

Col. 7, line 3, "cahnge" should read -- change --.

Col. 7, line 7, "changes" should read -- change --.

Col. 7, line 36, the second occurrence of "The" should read -- the --.

PO-1050
(5/69)

UNITED STATES PATENT OFFICE
CERTIFICATE OF CORRECTION

Page 2.

Patent No. 3,579,292　　　　　Dated May 18, 1971

Inventor(s) J.T. Mullhaupt et al.

It is certified that error appears in the above-identified patent and that said Letters Patent are hereby corrected as shown below:

Col. 8, line 20, delete the entire line and insert the following in its place:

-- tion, it is useful to define _average_ (or mean) rates of dis- --.

Col. 11, line 30, "formel" should read -- formed --.

Col. 13, line 44, "rate" should read -- rates --.

Col. 14, line 48, "advantge" should read -- advantage --.

Signed and sealed this 14th day of December 1971.

(SEAL)
Attest:

EDWARD M. FLETCHER, JR.
Attesting Officer

ROBERT GOTTSCHALK
Acting Commissioner of Patents